US008473471B2

(12) United States Patent
Nagai (10) Patent No.: US 8,473,471 B2
(45) Date of Patent: Jun. 25, 2013

(54) INFORMATION PROCESSING APPARATUS, METHOD, PROGRAM AND STORAGE MEDIUM

(75) Inventor: Hiroyuki Nagai, Sakai (JP)

(73) Assignee: Canon Kabushiki Kaisha, Tokyo (JP)

( * ) Notice: Subject to any disclaimer, the term of this patent is extended or adjusted under 35 U.S.C. 154(b) by 445 days.

(21) Appl. No.: 12/556,523

(22) Filed: Sep. 9, 2009

(65) Prior Publication Data

US 2010/0106751 A1 Apr. 29, 2010

(30) Foreign Application Priority Data

Oct. 24, 2008 (JP) ................................. 2008-274863

(51) Int. Cl.
*G06F 17/30* (2006.01)
*G06F 7/00* (2006.01)

(52) U.S. Cl.
USPC ............. 707/705; 707/722; 707/723; 706/45; 706/46; 706/47

(58) Field of Classification Search
None
See application file for complete search history.

(56) References Cited

U.S. PATENT DOCUMENTS

| | | | | |
|---|---|---|---|---|
| 6,018,738 | A * | 1/2000 | Breese et al. | 707/749 |
| 6,144,964 | A * | 11/2000 | Breese et al. | 707/758 |
| 6,366,913 | B1 * | 4/2002 | Fitler et al. | 709/203 |
| 6,535,879 | B1 * | 3/2003 | Behera | 707/785 |
| 6,704,464 | B2 | 3/2004 | Ohdate et al. | |
| 6,795,092 | B1 | 9/2004 | Nagai et al. | |
| 7,051,048 | B2 | 5/2006 | Sohma et al. | |
| 7,155,427 | B1 * | 12/2006 | Prothia et al. | 707/694 |
| 7,203,675 | B1 * | 4/2007 | Papierniak et al. | 707/600 |
| 2004/0049499 | A1 * | 3/2004 | Nomoto et al. | 707/3 |
| 2007/0255760 | A1 | 11/2007 | Itoh et al. | |
| 2008/0243791 | A1 * | 10/2008 | Suzuki et al. | 707/3 |

FOREIGN PATENT DOCUMENTS

| | | |
|---|---|---|
| JP | 5-113921 A | 5/1993 |
| JP | 11053371 A | 2/1999 |
| JP | 2002175298 A | 6/2002 |
| JP | 2004145706 A | 5/2004 |
| JP | 2006-59090 A | 3/2006 |
| JP | 2006-92251 A | 4/2006 |
| JP | 2006-107110 A | 4/2006 |
| JP | 2006107110 A | 4/2006 |

OTHER PUBLICATIONS

Japanese Office Action dated Mar. 22, 2013, in counterpart Japanese Application No. 2008-274863.

* cited by examiner

*Primary Examiner* — Angelica Ruiz
(74) *Attorney, Agent, or Firm* — Fitzpatrick, Cella, Harper & Scinto

(57) ABSTRACT

An information processing apparatus comprises: a receiving unit adapted to receive designation of a plurality of types of attribute values, which indicate characteristics of data, from a user; a presenting unit adapted to selectably present data having a characteristic that matches at least any one of the attribute values for which a designation has been received, from among a plurality of items of data that have been stored in a storage unit for storing the plurality of items of data and each of the attribute values of the plurality of items of data; and an updating unit adapted to update an attribute value, which has been stored in the storage unit, of data that has been selected by the user from among the presented data, the updating being performed based upon an attribute value for which a designation has been received.

19 Claims, 10 Drawing Sheets

| UPDATE DATE AND TIME | TECHNOLOGY | CREATOR | TYPE |
|---|---|---|---|
| ☐ TODAY | ☐ FULL-TEXT SEARCH | ☐ SELF | ☐ SPECIFICATION |
| ☐ YESTERDAY | ☐ VIDEO SEARCH | ☐ DEPARTMENT CHIEF B | ☐ PROGRESS REPORT |
| ☐ IN LAST 3 DAYS | ☐ IMAGE SEARCH | ☐ SECTION CHIEF C | ■ INVESTIGATIVE REPORT |
| ☐ IN LAST WEEK | ■ DATABASE | ☐ EDITOR D | ☐ INVESTIGATIVE REPORT |
| ☐ IN LAST 2 WEEKS | ☐ DATA MANAGEMENT | ☐ MANAGER E | ☐ DEVELOPMENT PROJECT |
| ☐ IN LAST MONTH | ☐ INFORMATION VISUALIZATION | ☐ THEME-A MEMBER | ☐ PRESENTATION MATERIALS |
| ☐ IN LAST 3 MONTHS | ☐ DOCUMENT SUMMARY | ☐ XX DEVELOPMENT ROOM | ☐ MINUTES |
| ☐ IN LAST 6 MONTHS | ☐ XML | ☐ YY DEVELOPMENT ROOM | ☐ PATENT |
| ☐ IN LAST YEAR | ☐ SECURITY | ☐ MR. K | ☐ IN-HOUSE REGULATIONS |
| ☐ EARLIER THAN LAST YEAR | ☐ OTHER | ☐ OTHER | ☐ OTHER |

MATCHING DOCUMENTS

☐ INFORMATION HOME-APPLIANCE EXHIBITION FIELD-TRIP REPORT
☐ SERVER INVESTIGATION
☐ FILE-SYSTEM INVESTIGATIVE REPORT
☐ BUILT-IN DATABASE TRENDS
☐ OTHER COMPANY'S DATABASE INVESTIGATIVE REPORT

FIG. 4

| DOCUMENT NAME | UPDATE DATE | TECHNOLOGY | CREATOR | TYPE |
|---|---|---|---|---|
| INFORMATION HOME-APPLIANCE EXHIBITION FIELD-TRIP REPORT | 2006/10/25 | DATABASE | MANAGER E | INVESTIGATIVE REPORT |
| SERVER INVESTIGATION | 2006/11/2 | DATABASE | MANAGER E | INVESTIGATIVE REPORT |
| FILE-SYSTEM INVESTIGATIVE REPORT | 2006/12/25 | DATABASE | SECTION CHIEF C | INVESTIGATIVE REPORT |
| BUILT-IN DATABASE TRENDS | 2007/2/11 | DATABASE | MR. K | INVESTIGATIVE REPORT |
| OTHER COMPANY'S DATABASE INVESTIGATIVE REPORT | 2007/4/5 | DATABASE | (NOT SET) | (NOT SET) |

| DOCUMENT NAME | UPDATE DATE | TECHNOLOGY | CREATOR | TYPE |
|---|---|---|---|---|
| INFORMATION HOME-APPLIANCE EXHIBITION FIELD-TRIP REPORT | 2006/10/25 | DATABASE | MANAGER E | INVESTIGATIVE REPORT |
| SERVER INVESTIGATION | 2006/11/2 | DATABASE | MANAGER E | INVESTIGATIVE REPORT |
| FILE-SYSTEM INVESTIGATIVE REPORT | 2006/12/25 | DATABASE | SECTION CHIEF C | INVESTIGATIVE REPORT |
| BUILT-IN DATABASE TRENDS | 2007/2/11 | DATABASE | MR. K | INVESTIGATIVE REPORT |
| OTHER COMPANY'S DATABASE INVESTIGATIVE REPORT | 2007/4/5 | DATABASE | (NOT SET) | INVESTIGATIVE REPORT |

| IMAGE NAME | SHOOTING DATE | TYPE | DEGREE OF PORTRAIT-LIKE QUALITY |
|---|---|---|---|
| 1. jpg | 2006/10/25 | PORTRAIT IMAGE | 90% |
| 2. jpg | 2006/11/02 | PORTRAIT IMAGE | 85% |
| 3. jpg | 2007/02/11 | UNKNOWN | 55% |
| 4. jpg | 2006/08/09 | UNKNOWN | 35% |

| IMAGE NAME | SHOOTING DATE | TYPE | DEGREE OF PORTRAIT-LIKE QUALITY |
|---|---|---|---|
| 1.jpg | 2006/10/25 | PORTRAIT IMAGE | 90% |
| 2.jpg | 2006/11/02 | PORTRAIT IMAGE | 85% |
| 3.jpg | 2007/02/11 | PORTRAIT IMAGE | 85% |
| 4.jpg | 2006/08/09 | UNKNOWN | 35% |

INFORMATION PROCESSING APPARATUS, METHOD, PROGRAM AND STORAGE MEDIUM

BACKGROUND OF THE INVENTION

1. Field of the Invention

The present invention relates to an information processing apparatus, method and program, and to a storage medium on which this program has been stored. More particularly, the invention relates to a technique for assigning attribute values to electronic data.

2. Description of the Related Art

Conventionally, in order to facilitate management of electronic data, the data is assigned attribute values such as a data name, date and time of creation and data type. By providing a function such as a function for conducting a search using these attribute values, it is easy for a user to arrive at the target data using a data management apparatus. There are attribute values that can be assigned automatically, as in the manner of creation date and time, by an apparatus based upon sensor information sensed automatically at the time of data acquisition, and attribute values that can be assigned manually by the user, as in the manner of data name. There are also instances where an attribute is assigned automatically upon analyzing the content of data. When data is managed using such attribute values, an important consideration is how to assign highly reliable attribute values to data with little burden being imposed upon the user.

As an example of a known technique relating to assignment of attribute values is an arrangement in which, by using data to which an attribute value has already been assigned, the attribute value thereof is borrowed for use (see the specification of Japanese Patent Laid-Open No. 11-053371). A further example of a known technique relating to assignment of attribute values is an arrangement in which, when an attribute value is assigned manually, the burden of manual assignment is reduced by so arranging it that assignment can be achieved using a selection format to select the attribute value from a list of already prepared attribute values (see the specification of Japanese Patent Laid-Open No. 2002-175298).

A further example of a known technique relating to assignment of attribute values is an arrangement in which, when the target data is finally found after conducting a search while changing the search condition multiple times because matching data could not be obtained, keywords that were the search conditions used until the target data was found are assigned as attribute values (see the specification of Japanese Patent Laid-Open No. 2004-145706). Still another example of a known technique relating to assignment of attribute values is an arrangement in which, rather than attempting to solve the problem by assigning an attribute value, data to which an attribute value has not yet been assigned is also added to a search-result data list at the time of a search, thereby enabling data to be found even if an attribute value has not been assigned (see the specification of Japanese Patent Laid-Open No. 2006-107110).

However, with the arrangement for analyzing data and assigning an attribute value automatically, the reliability of an attribute value obtained from an analytical result generally is low. This holds true for an attribute value indicating a highly abstract characteristic, such as an attribute value representing the content of data. A problem which arises is that a value obtained may be different from the value sought by the user.

Further, with the arrangement that makes borrowed use of an attribute value from existing data or the arrangement that assigns an attribute value upon preparing a list of attribute values in advance, the problem is that the target data will not be hit upon in the search until the user performs the processing for assigning the attribute value.

Further, with the arrangement in which the attribute values used are the keywords of search conditions that have been changed when conducting a search while making the change in search conditions, it is necessary to manage from when to when searches were tried in order to find the same data.

Further, with the arrangement in which data is included in search results even though an attribute value has not yet been assigned thereto, the search results come to include a large quantity of noise. This is a problem since it detracts from search accuracy.

SUMMARY OF THE INVENTION

The present invention has been devised in view of the problems set forth above and seeks to provide a technique in which search accuracy is improved by assigning an appropriate attribute value to data that is the target of a search without burdening the user with a complicated operation.

According to one aspect of the present invention, an information processing apparatus includes: a receiving unit adapted to receive designation of a plurality of types of attribute values, which indicate characteristics of data, from a user; a presenting unit adapted to selectably present data having a characteristic that matches at least any one of the attribute values for which a designation has been received by the receiving unit, from among a plurality of items of data that have been stored in a storage unit for storing the plurality of items of data and each of the attribute values of the plurality of items of data; and an updating unit adapted to update an attribute value, which has been stored in the storage unit, of data that has been selected by the user from among the data presented by the presenting unit, the updating being performed based upon an attribute value for which a designation has been received by the receiving unit.

According to another aspect of the present invention, an information processing method of an information processing apparatus, includes: a receiving step of receiving designation of a plurality of types of attribute values, which indicate characteristics of data, from a user; a presenting step of selectably presenting data having a characteristic that matches at least any one of the attribute values for which a designation has been received at the receiving step, from among a plurality of items of data that have been stored in a storage unit for storing the plurality of items of data and each of the attribute values of the plurality of items of data; and an updating step of updating an attribute value, which has been stored in the storage unit, of data that has been selected by the user from among the data presented at the presenting step, the updating being performed based upon an attribute value for which a designation has been received at the receiving step.

According to still another aspect of the present invention, a computer-readable storage medium stores a program for causing a computer to execute the following steps: a receiving step of receiving designation of a plurality of types of attribute values, which indicate characteristics of data, from a user; a presenting step of selectably presenting data having a characteristic that matches at least any one of the attribute values for which a designation has been received at the receiving step, from among a plurality of items of data that have been stored in a storage unit for storing the plurality of items of data and each of the attribute values of the plurality of items of data; and an updating step of updating an attribute value, which has been stored in the storage unit, of data that has been selected by the user from among the data presented at the presenting step, the updating being performed based upon an attribute value for which a designation has been received at the receiving step.

Further features of the present invention will become apparent from the following description of exemplary embodiments with reference to the attached drawings.

DESCRIPTION OF THE EMBODIMENTS

Embodiments of the present invention will be described below in detail with reference to the accompanying drawings. It should be noted that the constituent elements set forth in the embodiments are merely for illustrative purposes and do not constitute gist that limits the scope of the invention to these elements. Further, all combinations of features described in the embodiments are not necessarily essential in the present invention.

First Embodiment (Hardware Configuration)

Figure 1:
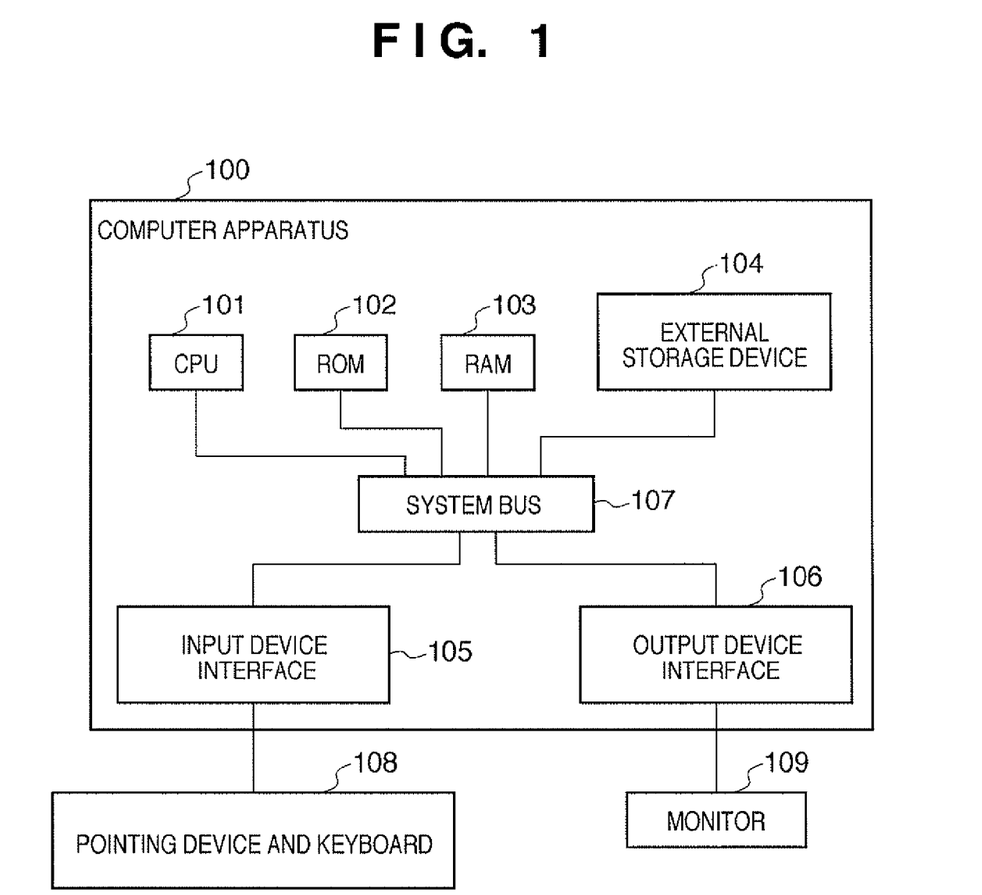
FIG. 1 is a block diagram illustrating the hardware configuration of a computer apparatus.

A computer apparatus (information processing apparatus) 100 of this embodiment will be described with reference to FIG. 1, which is a block diagram illustrating the hardware configuration of the computer apparatus 100. The computer apparatus 100 includes a central processing unit (CPU) 101 for controlling the overall computer apparatus 100; a read-only memory (ROM) 102 for storing programs and parameters that do not require any change; and a random-access memory (RAM) 103 for temporarily storing programs and data supplied from an external unit, etc.

The computer apparatus 100 further includes an external storage device 104 capable of being implemented by a hard disk or memory card, etc., permanently installed in the computer apparatus 100. Alternatively, the external storage device 104 may be implemented by an optical disk, magnetic or optical card, IC card or memory card, etc., such as a flexible disk (FD) or compact disk (CD), which is removably loaded in the computer apparatus 100.

The computer apparatus 100 further includes an interface 105 operated by the user for interfacing an input device that inputs data. The input device can be implemented by, e.g., a pointing device and keyboard 108. The computer apparatus 100 further includes an interface 106 which interfaces a monitor 109 for displaying data held by the computer apparatus 100 and data that has been supplied, and a system bus 107 for connecting the units 101 to 106 so that they can communicate with one another.

In this embodiment, program code for document management according to this embodiment has been stored in the external storage device 104, and the program is executed by the computer apparatus 100 under the control of CPU 101. The user performs operations using the pointing device and keyboard 108 and obtains a response from the monitor 109. It should be noted that the program code for document management may be stored in another storage device such as the ROM 102.

(Functional Configuration)

When the computer apparatus 100 executes the program code for document management, it is referred to as a document management apparatus. The functional configuration of a document management apparatus 200 will be described with reference to FIG. 2, which is a diagram illustrating a group of functional elements that construct the document management apparatus 200.

Figure 2:
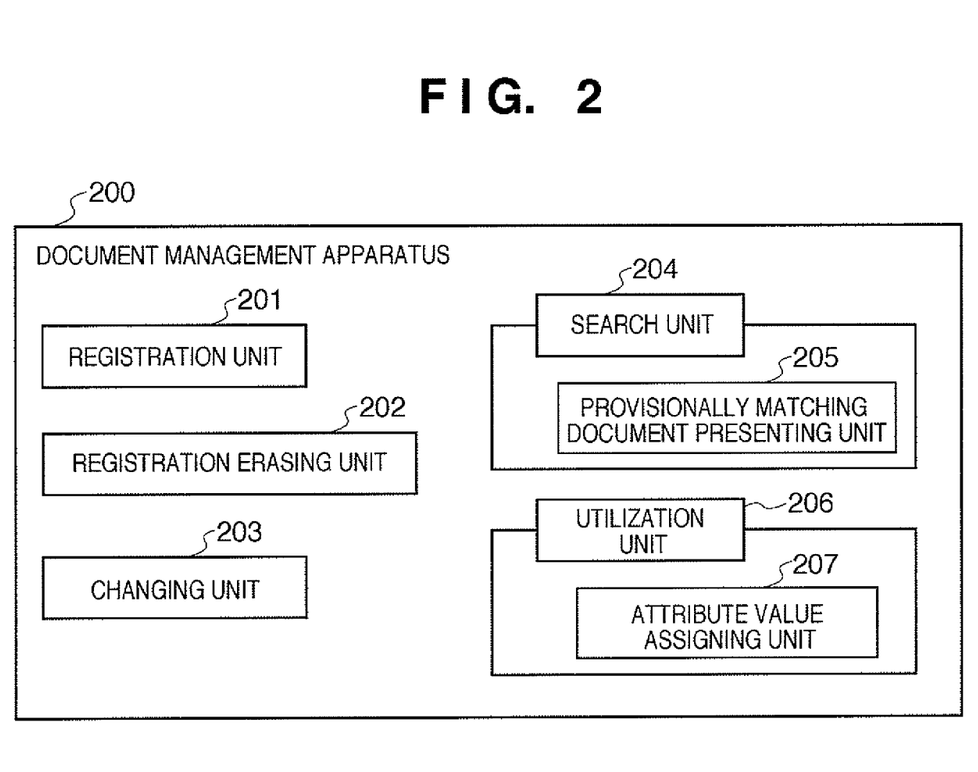
FIG. 2 is a diagram illustrating a group of functional elements that construct a document management apparatus.

A registration unit 201 is a functional element for registering a document in a document management layer. A document that has been designated by the user is used when management is started by the document management apparatus 200. At the time of registration, attribute values are assigned to some attributes such as document name and update date and time. A registration erasing unit 202 is a functional element for erasing a registered document as a management target. The registration erasing unit 202 is used when the user has specified that management of a document registered by the registration unit 201 is to be suspended. A changing unit 203 is a functional element for changing the content or attribute value of a document being managed and is used when the user has specified that the content or attribute value of a document is to be changed.

A search unit 204 is a functional element for searching documents. The search unit 204 is used when the user designates an attribute value possessed by a document and finds the document to be utilized. This functional element includes a unit 205 for presenting provisionally matching documents. The details will be described later.

A utilization unit 206 is a functional element for controlling utilization of a retrieved document and is used when the user has specified utilization of a document found by the search unit 204. Here "utilization" can mean viewing of the document, printing of the document or transmission of the document to another apparatus. This functional element includes an attribute value assigning unit 207.

It should be noted that document data under management has been stored in the storage device of an external apparatus (not shown) together with attribute values indicating each of the characteristics of this data. However, the document data and attribute values may also be stored in the document management apparatus 200 (e.g., in the external storage device 104).

(Example of Display Screen)

Figure 3:
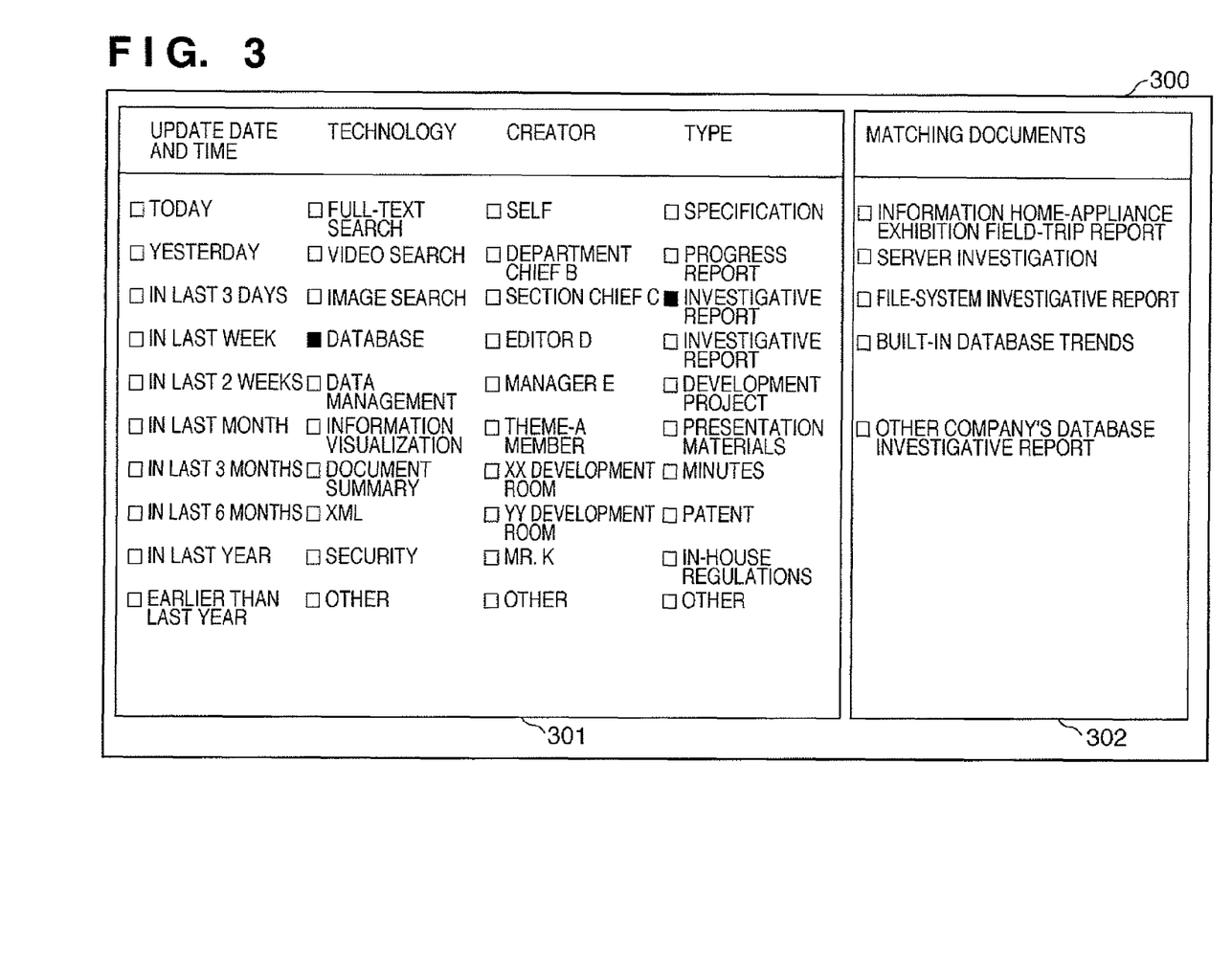
FIG. 3 is a diagram illustrating an example of a display screen that a search unit uses in dialog with a user.

FIG. 3 is a diagram illustrating an example of a display screen that the search unit 204 uses in dialog with a user. This screen is displayed on the monitor 109. The screen includes a search-condition input area 301 and a search-result display area 302.

A list of attribute values possessed by a group of documents that have been registered in the document management apparatus 200 is displayed in the search-condition input area 301. When the user searches for a required document, the user selects the attribute values possessed by the document. The user employs the pointing device and keyboard 108 to select the attribute values. When an attribute value in the search-condition input area 301 is selected, a display that makes this known is presented. In this way the document management apparatus 200 executes acceptance processing for accepting designation of multiple types of attribute values indicating the characteristics of the data.

In the example of FIG. 3, "UPDATE DATE", "TECHNOLOGY", "CREATOR" and "TYPE" are attributes used in a search. A list of attribute values of these attributes is being displayed. The attribute value "DATABASE" under "TECHNOLOGY" and the attribute value "INVESTIGATIVE REPORT" under "TYPE" have been selected. In other words, FIG. 3 indicates a state in which the user is searching for a document for which the "TECHNOLOGY" and "TYPE" are "DATABASE" and "INVESTIGATIVE REPORT", respectively.

The search-result display area 302 is an area for displaying a list of documents that match the search conditions designated in the search-condition input area 301. In the example of FIG. 3, document names are being displayed. Here five documents are being displayed as matching documents in response to the conditions that have been input in the search-condition input area 301. Among these five documents, "OTHER COMPANY'S DATABASE INVESTIGATIVE REPORT" is being displayed in a manner distinguishable from the other four documents. The reason is to distinguish this document because it does not strictly match the search conditions. The details will be described later.

A selection from the list of documents in the search-result display area 302 can be made by the user using the pointing device and keyboard 108 in the same manner that search conditions are selected. Furthermore, the user can specify the method of utilizing the document selected.

(Examples of Attribute Values)

Figure 4:
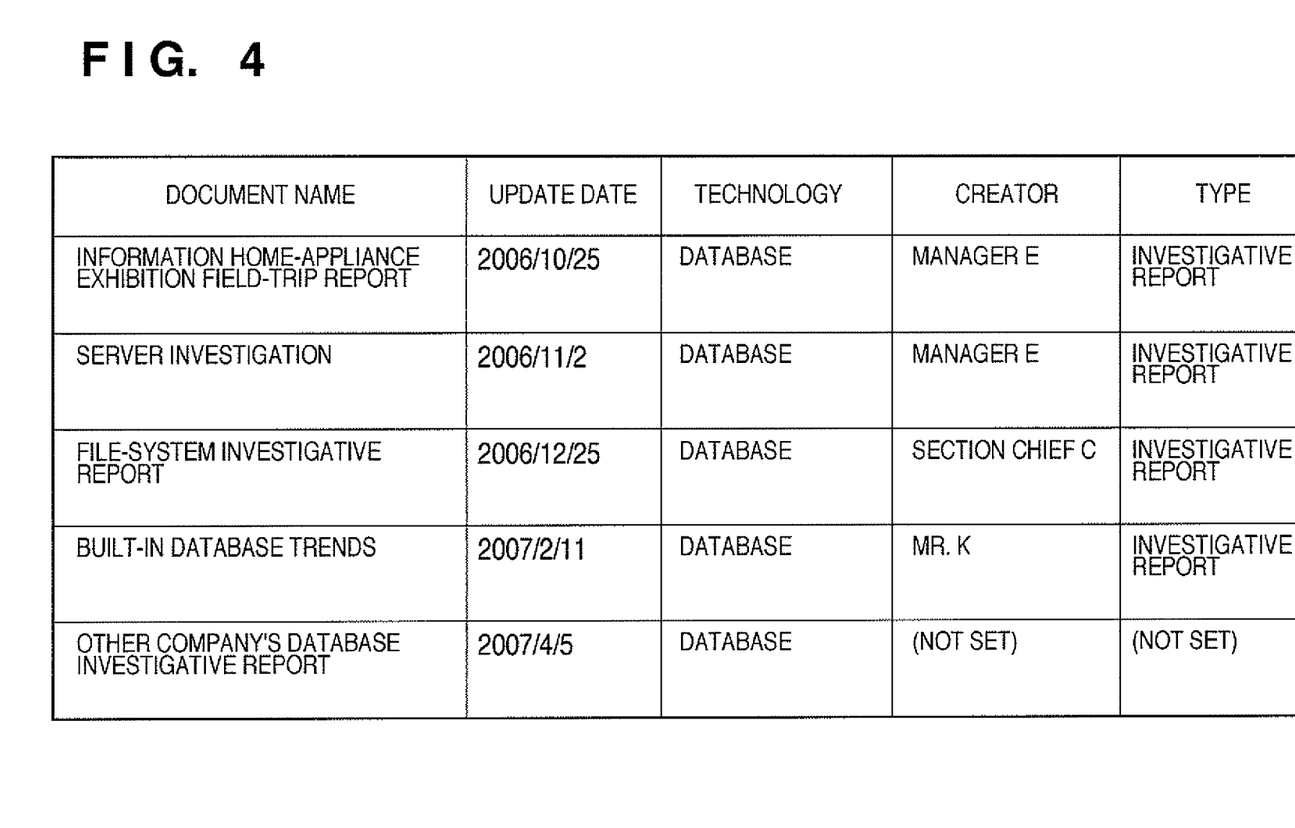
FIG. 4 is a diagram illustrating examples of attribute values possessed by documents.

FIG. 4 is a diagram illustrating examples of attribute values possessed by the five documents exemplified in FIG. 3. In all of these documents, the attribute value of the attribute "TECHNOLOGY" is "DATABASE". Further, the attribute value of the attribute "TYPE" in the other four documents is "INVESTIGATIVE REPORT".

The search conditions in the example of FIG. 3 are for documents whose attribute value of the "TECHNOLOGY" attribute is "DATABASE" and whose attribute value of the "TYPE" attribute is "INVESTIGATIVE REPORT". Therefore, the document "OTHER COMPANY'S DATABASE INVESTIGATIVE REPORT" does not match the search conditions. However, since some attribute values for this document have not been set, this document may become a matching document when the attribute values are set. In view of this possibility, a document for which a value of an attribute designated by a search condition has not been set is placed in the list of search results. However, the document is placed in the list in a manner distinguishable from documents that truly match the search conditions. This is the reason why only the document "OTHER COMPANY'S DATABASE INVESTIGATIVE REPORT" is being displayed in the search-result display area 302 in a form distinguishable from the other documents. The term "provisionally matching document" is used below to refer to a document (data) which does not match all attribute values designated by the search conditions but which matches some of the attribute values.

(Processing Flow)

Figure 5:
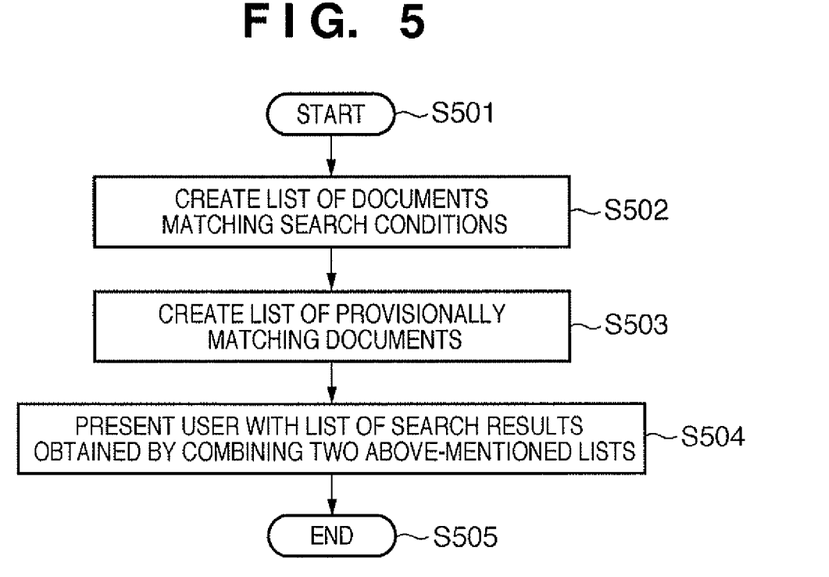
FIG. 5 is a flowchart of search processing executed by a search unit.

FIG. 5 is a flowchart of search processing executed by the search unit 204 in order to display search results (FIG. 3). The processing by the search unit 204 starts in response to a search request from the user (step S501). As mentioned earlier, the search request from the user is implemented by accepting from the user a designation of attribute values of multiple attributes indicating the characteristics of data.

First, from a group of documents that have already been registered, the search unit 204 creates a list of documents that match search conditions (step S502). Specifically, from document data that is the object of the search, the search unit 204 creates a list of data having characteristics matching all attribute values for which a designation has been accepted in the search request from the user.

Next, the search unit 204 creates a list of provisionally matching documents from the group of documents registered (step S503). That is, from the document data that is the object of the search, the search unit 204 creates a list of provisionally matching documents, namely data having characteristics which do not match all attribute values designated by the user but which match at least any one of the attribute values. The creation of the list of provisionally matching documents is performed by the unit 205 for presenting provisionally matching documents.

Next, a list obtained by combining the lists created at steps S502 and S503 is presented to the user in selectable fashion as a list of search results (step S504). As mentioned above, it is best when the items of data of matching documents (data matching all attribute values for which a designation has been accepted) and the items of data of provisionally matching documents (data which matches some attribute values for which a designation has been accepted but not all of these attribute values) are presented in a form distinguishable from each other. This ends the processing executed by the search unit 204 (step S505).

Figure 6:
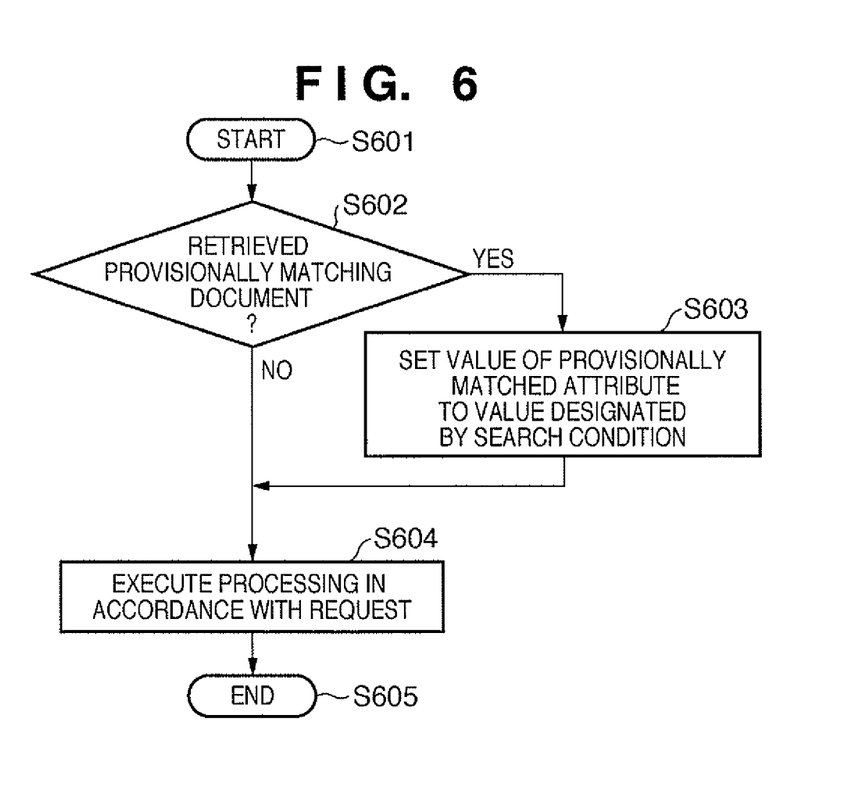
FIG. 6 is a flowchart of processing executed by a utilization unit.

FIG. 6 is a flowchart of processing executed by the utilization unit 206 when the user selects a document in the search-result display area 302 and designates its utilization. The utilization unit 206 is started by a utilization request (S601) from the user. Specifically, the user selects any item of data presented in the search-result display area 302 and requests utilization of this data. In accordance with the utilization requested, the utilization unit 206 starts executing processing.

The utilization unit 206 first determines whether the target document selected was a provisionally matching document in the search (step S602). If the document was a provisionally matching document, then the utilization unit 206 sets the value of the provisionally matching attribute to the value designated by the search condition (step S603). This processing is executed by the attribute value assigning unit 207. In the case of the example shown in FIG. 3, the value of the "TYPE" attribute of the "OTHER COMPANY'S DATABASE INVESTIGATIVE REPORT" document is set to "INVESTIGATIVE REPORT", which has been designated by the search condition. This corresponds to processing in which a document presented as a provisionally matching document is utilized by the user, whereby the document is regarded as a truly matching document and this fact is reflected in the attribute value. The attribute value assigning unit 207 may perform this processing automatically without informing the user or may notify the user of assignment of this attribute value and allow the user to select whether or not the assignment should be made.

When processing for setting the attribute value ends at step S603, or when it is determined at step S602 that the target document was not a provisionally matching document, processing such as printing, etc., is executed in conformity with the utilization request (step S604). This ends utilization processing (step S605).

(Example of Result of Processing)

Figure 7:
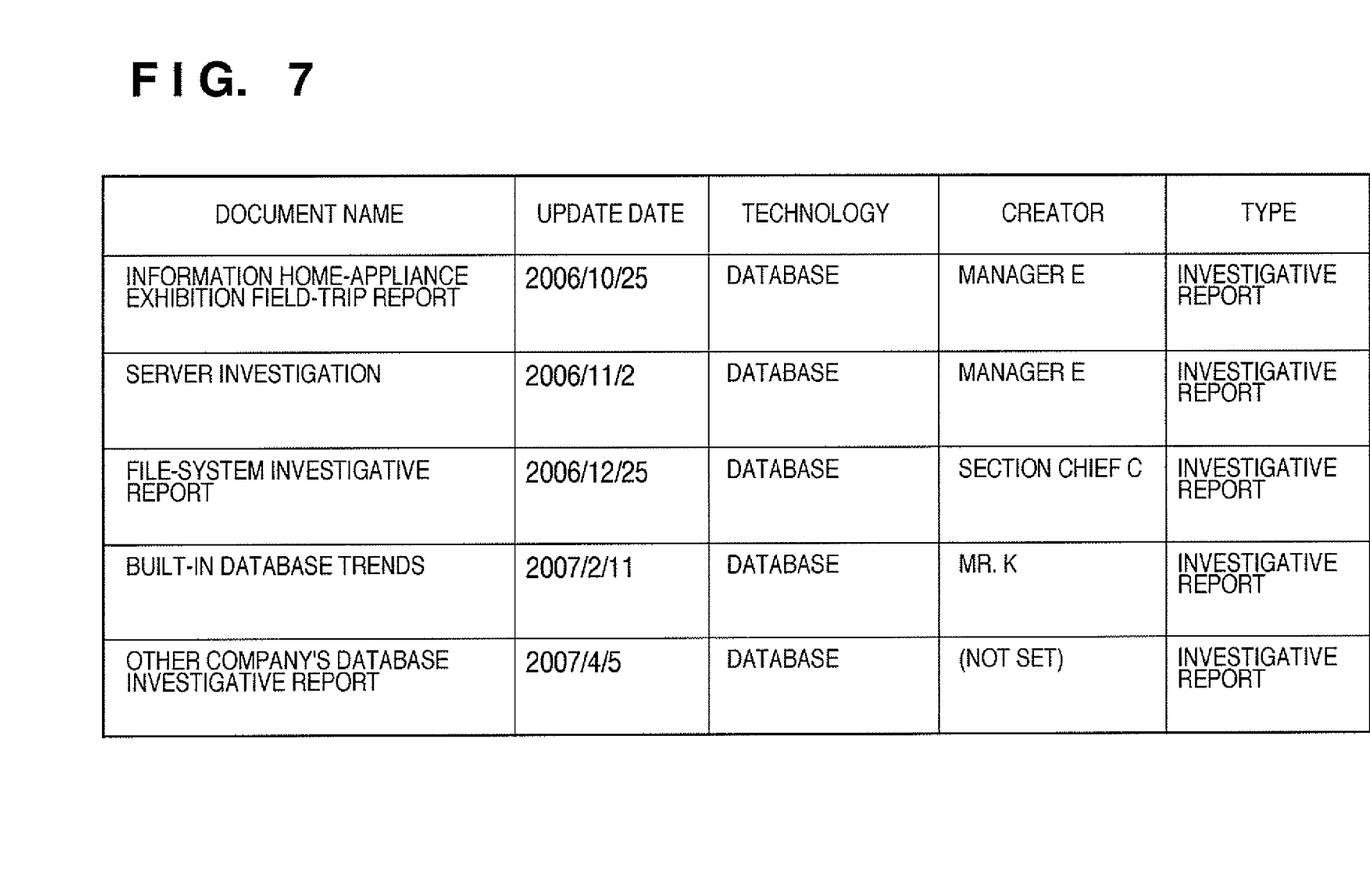
FIG. 7 is a diagram illustrating examples of attribute values after execution of processing.

FIG. 7 is a diagram representing how an attribute value has been changed by the attribute value assigning unit 207 after utilization of the "OTHER COMPANY'S DATABASE INVESTIGATIVE REPORT" document in the example of FIG. 3. If a comparison is made to FIG. 4, it will be understood that whereas the attribute value of the "TYPE" attribute of the "OTHER COMPANY'S DATABASE INVESTIGATIVE REPORT" document has not been set in FIG. 4, this has been changed to the value "INVESTIGATIVE REPORT" in FIG. 7. Owing to the change, the "OTHER COMPANY'S DATABASE INVESTIGATIVE REPORT" document will be a true matching document the next time a search is conducted using the same search conditions. It should be noted that the "CREATOR" attribute of the "OTHER COMPANY'S DATABASE INVESTIGATIVE REPORT" document also does not have a set attribute value. There is no change in the attribute value before and behind the attribute value assigning unit 207. The value of this attribute is not assigned because a condition relating to this attribute was not set at the time of the search. If a search condition has not been set, then what the user considers the value of the attribute of this document to be cannot be determined even if the document is utilized. Hence, the attribute value is not set.

In this embodiment, as described above, data having a characteristic that matches at least any one of attribute values designated by the user is selectably presented from data that undergoes a search. The attribute value of data selected by the user from among the presented data is updated based upon an attribute value designated by the user. Thus, in accordance with the arrangement of this embodiment, the user can assign an attribute value that is appropriate for data under search without requiring that the user perform a complicated operation. Search accuracy can be improved.

Further, in this embodiment, an attribute value that has been designated by a search request can be set for an attribute value whose value has not yet been set among attribute values of data selected by the user in the search-result display area 302. In accordance with the arrangement of this embodiment, therefore, when a data search is conducted, suitable attribute values can be set automatically for data whose attribute values have not been set, without burdening the user with a special operation, and this can be achieved while the user performs operation as usual.

In this embodiment, a case where an attribute value designated by the user is set for an attribute value whose value has not been set among selected attribute values of data has been described as an example in which the attribute value of data is updated based upon an attribute value designated by a search request. However, this does not impose a limitation upon the present invention. For example, it may be so arranged that in a case where an attribute value is represented by a numerical value, the attribute value is increased or decreased in accordance with a selection made by the user. As such an example, an arrangement according to a second embodiment (set forth below) will be described in which, from among attribute values of data selected by a user, an attribute value which indicates by a numerical value the degree of certainty that data will possess a prescribed characteristic is increased or decreased based upon an attribute value indicating whether or not this characteristic has been designated by a search request.

Further, in this embodiment, data that is the result of a search is presented such that data matching all attribute values designated by a search request and data that does not match all attribute values can be distinguished from each other. In accordance with the arrangement of this embodiment, therefore, the user may readily distinguish between matching documents and provisionally matching documents and can select documents to be utilized.

It should be noted that in the example of FIG. 3, two attribute values are designated by the search conditions and one attribute value has not been set for the provisionally matching document. However, a provisionally matching document may have several attributes for which values have not been set. For example, the "OTHER COMPANY'S DATABASE INVESTIGATIVE REPORT" document is presented as a provisionally matching document even though the "TECHNOLOGY" attribute has not been set. In this case, the larger the number of attribute values that have not been set, the lower the degree of matching with the search results, and documents may be utilized in the order in which the degrees of matching are displayed in the search-result display area.

Further, in the example of FIG. 3, the value of each attribute designated by a search condition is a single value. However, it may be so arranged that a plurality of values can be designated. In the example of the display shown in FIG. 3, selecting a plurality of values for a single attribute corresponds to enabling the selection of attribute values in the same column. For example, this means selecting both "INVESTIGATIVE REPORT" and "TECHNICAL REPORT" attribute values of the "TYPE" attribute. In such case, the attribute value of the "TYPE" attribute will indicate the "INVESTIGATIVE REPORT" or "TECHNICAL REPORT" document as the search condition. In a case where a provisionally matching document is utilized under such a search condition, the user may be prompted to select which attribute value should be assigned. Alternatively, it may be so arranged that in order to not burden the user with a selection, in such case an attribute value is not assigned, i.e., only when there is a lone attribute value is the attribute value assigned.

Further, with regard to the attribute value assigning unit 207, the user does not confirm assignment of an attribute value (i.e., does not perform update confirmation). However, it may be so arranged that confirmation is presented to the user before assignment of an attribute value and the user is allowed to cancel the assignment of the attribute value. That is, it may be so arranged that the attribute value of retrieved data is updated in accordance with update confirmation from the user. As a result, updating of an attribute value contrary to the intent of the user can be prevented.

The foregoing is one example of an embodiment and the invention is not particularly limited to the display method and definition of document attributes exemplified above.

Second Embodiment

In the first embodiment, described is an arrangement for conducting a search of data for which an attribute value has not been set and performing assignment of an attribute value. Described in this embodiment, however, is an arrangement for conducting a search of data for which the reliability of an attribute value is low and performing assignment of an attribute value. Here the term "reliability" refers to an attribute value that uses a numerical value to indicate the degree of certainty that a prescribed characteristic is possessed. Further, an example of a case where data that undergoes a search is document data is described in the first embodiment. Described in this embodiment, however, is a case where data that undergoes a search is image data. The configuration of the computer apparatus in this embodiment is similar to that of the first embodiment and is as illustrated in FIG. 1.

(Functional Configuration)

Figure 8:
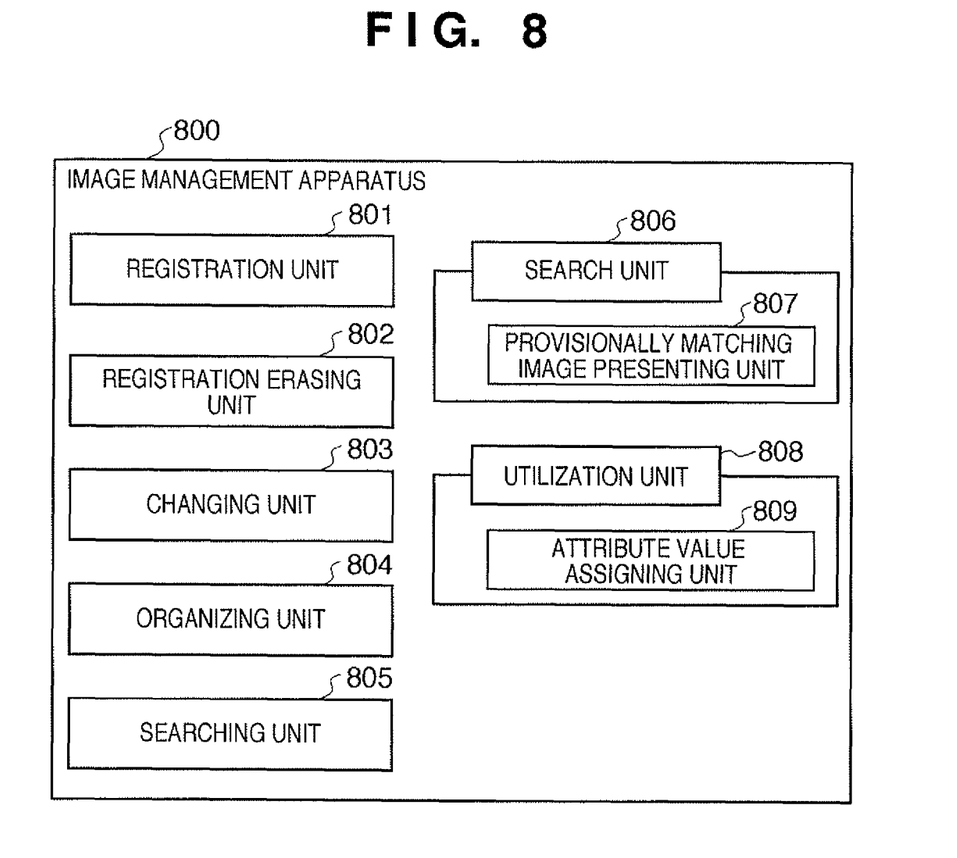
FIG. 8 is a diagram illustrating a group of functional elements that construct an image management apparatus.

FIG. 8 is a diagram illustrating a group of functional elements that construct an image management apparatus 800 implemented by program code for image management. In addition to components similar to those of the document management apparatus 200 shown in FIG. 2 of the first embodiment, the image management apparatus 800 includes an organizing unit 804 and a searching unit 805. The organizing unit 804 is a functional element which executes processing for organizing images and is used when the user organizes images by folders. The searching unit 805 is a functional element used when the user finds an image, which has been organized by the organizing unit 804, by looking inside a folder tree.

A case where this embodiment is applied also to an image management apparatus 800 that uses folders will be described. If the apparatus has a search function, then whether or not it has a folder function does not matter. However, there are instances where the image management apparatus 800 using folders has a search folder function. A search folder is one type of virtual folder. Search conditions are set in the search folder when the folder is created. A search folder can also be considered to be one form of user interface of a search function in that it presents to the user an indication as to whether an image matching a search condition is an element of the folder. The arrangement of this embodiment is applicable to this search folder as well. A provisionally matching image also is presented as a folder element of a search folder, and an attribute value is assigned to a provisionally matching image using a search condition that has been set in the search folder by utilizing the image.

(Example of Display Screen)

Figure 9:
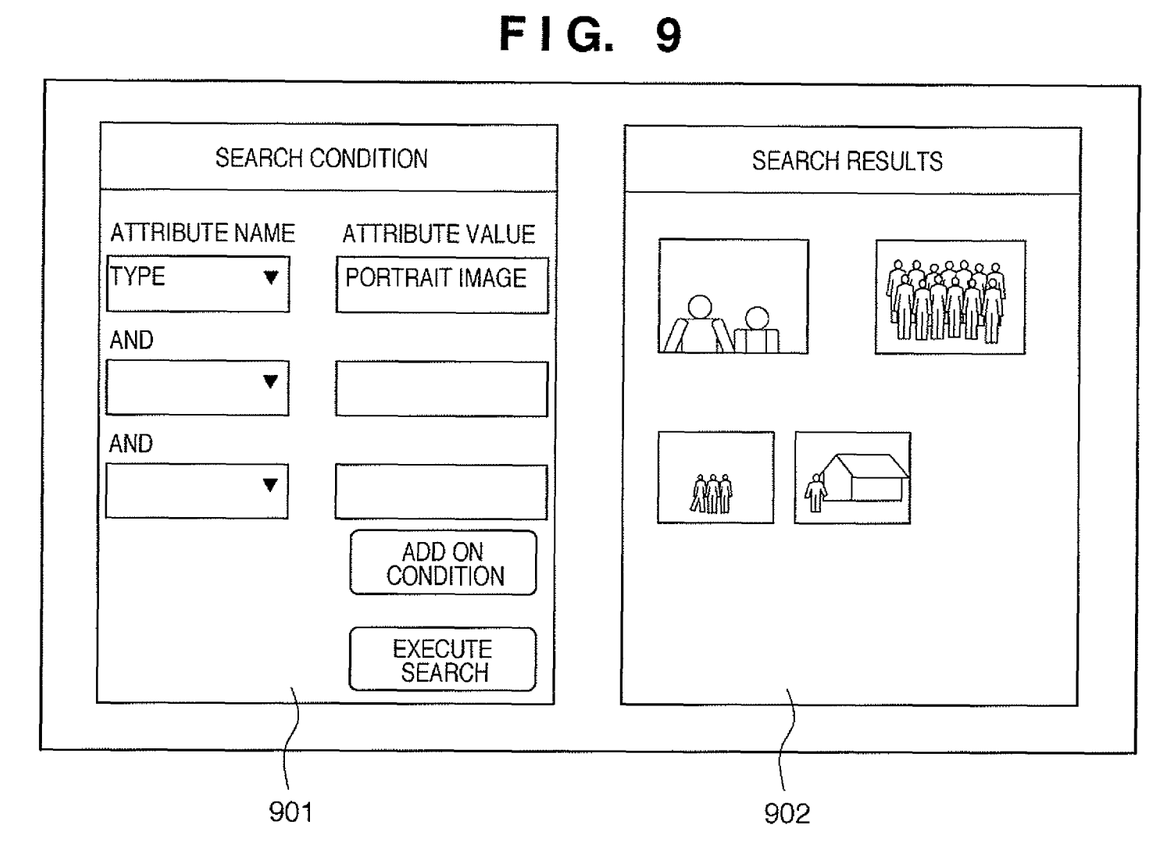
FIG. 9 is a diagram illustrating an example of a display screen that a search unit uses in dialog with a user.

FIG. 9 is a diagram illustrating an example of a display screen that a search unit 806 uses in dialog with a user. This screen is displayed on the monitor 109. The screen includes a search-condition input area 901 and a search-result display area 902.

The search-condition input area 901 is provided with fields for inputting an attribute name and an attribute value as a set. When searching for an image required by the user, the user inputs the attribute name and attribute value possessed by the image. The pointing device and keyboard 108 are used to perform the input. If a search execute button is pressed in a state in which an attribute name and attribute value have been input, images matching the search conditions will be displayed in the search-result display area 902.

Thumbnails (sample images of reduced size) are displayed in the search-result display area 902. Thumbnails are displayed in two sizes. Images displayed in large size at the top are images truly matching the search conditions. Images displayed in small size at the bottom are images provisionally matching the search conditions. A thumbnail in the search-result display area 902 can be selected by the user using the pointing device and keyboard 108.

Furthermore, the user can specify a method of utilizing a selected image. FIG. 9 illustrates a situation in which the user has input a search condition, the condition being an image whose "TYPE" attribute has an attribute value "PORTRAIT IMAGE", and in which the user has pressed the search execute button, as a result of which four matching images are displayed. The two lower images are provisionally matching images.

(Examples of Attribute Values)

Figure 10:
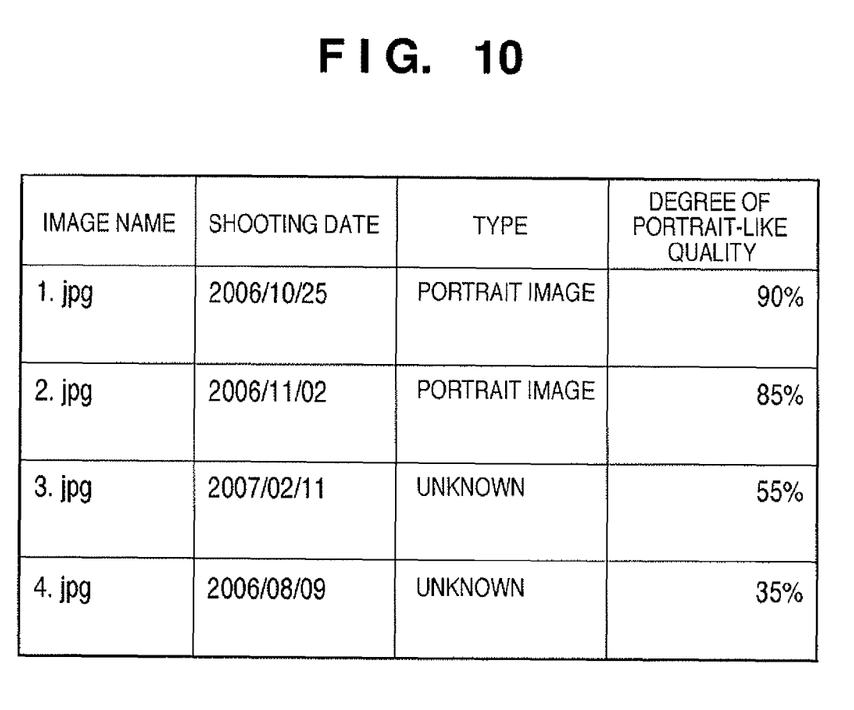
FIG. 10 is a diagram illustrating examples of attribute values possessed by images.

FIG. 10 is a diagram illustrating examples of attribute values possessed by the four images in the example of FIG. 9. The images at the upper left, upper right, lower left and lower right in FIG. 9 have image names "1.jpg", "2.jpg", "3.jpg" and "4.jpg", respectively. The attribute values of the "TYPE" attribute of the images having the image names "1.jpg" and "2.jpg" are both "PORTRAIT IMAGE". The attribute values of the "TYPE" attribute of the images having the image names "3.jpg" and "4.jpg" are both "UNKNOWN".

The attribute value of the "TYPE" attribute is given automatically from the attribute value of an attribute "DEGREE OF PORTRAIT-LIKE QUALITY". The "DEGREE OF PORTRAIT-LIKE QUALITY" attribute represents, by a value ranging from 0 to 100%, the degree to which the image has the likeness of the portrait image. The initial value is given automatically by an image recognition technique. The attribute value of the "TYPE" attribute is "SCENIC IMAGE" when the attribute value of the "DEGREE OF PORTRAIT-LIKE QUALITY" attribute is 0 to 30%; "UNKNOWN" when the attribute value of the "DEGREE OF PORTRAIT-LIKE QUALITY" attribute is 31 to 70%; and "PORTRAIT IMAGE" when the attribute value of the "DEGREE OF PORTRAIT-LIKE QUALITY" attribute is 71 to 100%. Since this indicates by a numerical value the degree of certainty that "TYPE" possesses the "PORTRAIT" characteristic, it is a value that can be construed as the reliability of the attribute value of the "TYPE" attribute.

Since the attribute values of the "DEGREE OF PORTRAIT-LIKE QUALITY" attribute of the images whose image names are "1.jpg", "2.jpg", "3.jpg" and "4.jpg" are "90%", "85%", "55%" and "35", respectively, the attribute values of the "TYPE" attribute of each are as mentioned above. In the example of FIG. 9, images for which the attribute value of the "TYPE" attribute is "PORTRAIT IMAGE" are displayed as true matching images, and images for which the attribute value of the "TYPE" attribute is "UNKNOWN" are displayed as provisionally matching images.

The flow of processing executed by the search unit 806 for presenting the display of FIG. 9 is shown in FIG. 5 and is the same as that of the first embodiment. However, when the list of provisionally matching images is created, the list is created utilizing a rule, given in advance, stipulating what the attribute value of a particular attribute should be in order for an image is to be regarded as a provisionally matching image. In the case of this example, the list of provisionally matching images is created based upon a rule stipulating that in a case where the attribute value of the "TYPE" attribute is "UNKNOWN", the image is to be regarded as a provisionally matching image.

(Processing Flow)

Figure 11:
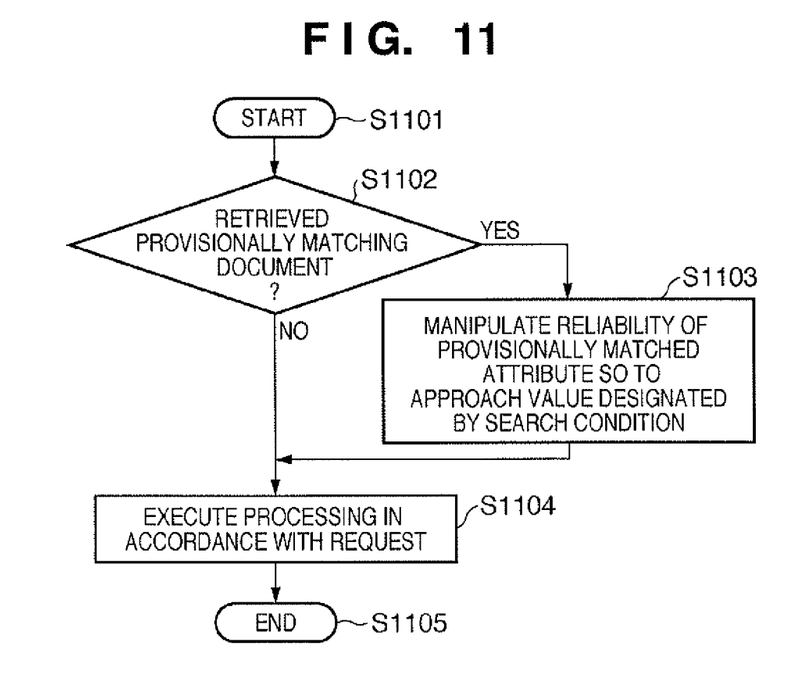
FIG. 11 is a flowchart of processing executed by a utilization unit.

FIG. 11 is a flowchart of processing executed by a utilization unit 808 when the user has selected an image using the search-result display area 902 and has specified utilization. Unlike the processing of FIG. 6 according to the first embodiment, this is processing executed by an attribute value assigning unit 809 in a case where a utilized image is a provisionally matching image. The processing of steps S1101, S1102, S1104 and S1105 is similar to the processing of steps S601, S602, S604 and S605 in FIG. 6 and need not be described again.

In this embodiment, the attribute value assigning unit 809 manipulates the reliability of an attribute that was a provisional match so to approach the value designated by the search condition (step S1103). In the above-described example, the attribute value assigning unit 809 manipulates the attribute value of the "PORTRAIT IMAGE" attribute corresponding to the reliability of the attribute value of the "TYPE" attribute. That is, in a case where the attribute value of the "TYPE" attribute has been designated as "PORTRAIT" by the search condition, a predetermined quantity (e.g., 30) is added to the attribute value of the "DEGREE OF PORTRAIT-LIKE QUALITY" attribute. In a case where the attribute value of the "TYPE" attribute has been designated as "SCENERY" by the search condition, a predetermined quantity (e.g., 30) is subtracted from the attribute value of the "DEGREE OF PORTRAIT-LIKE QUALITY" attribute. Thus, according to this embodiment, from among attribute values of data that have been selected by a user, an attribute value which indicates, by a numerical value, the degree of certainty that data possesses a predetermined characteristic is increased or decreased based upon an attribute value, which has been designated by the user, indicating whether or not the data possesses the predetermined characteristic.

(Example of Result of Processing)

Figure 12:
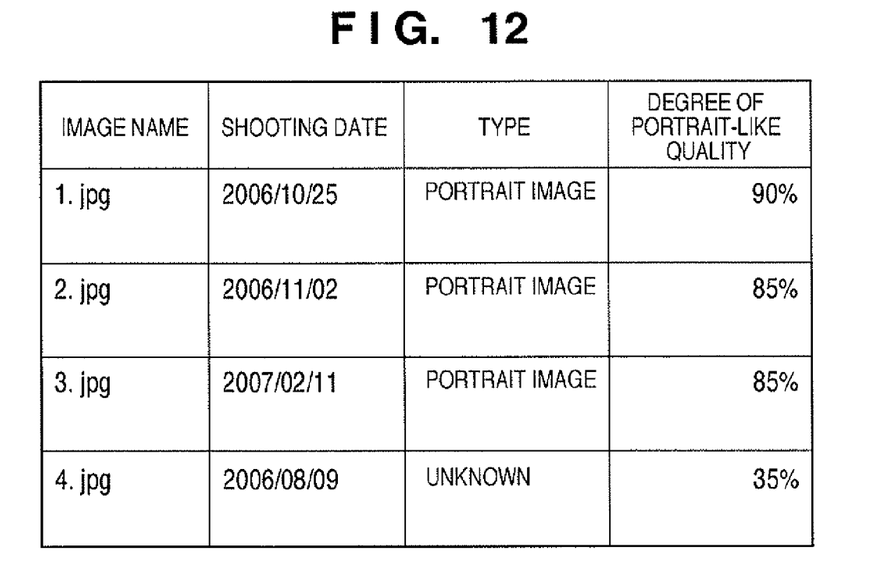
FIG. 12 is a diagram illustrating examples of attribute values after execution of processing.

FIG. 12 is a diagram representing how an attribute value has been changed by the attribute value assigning unit 809 after utilization of the "3.jpg" image in the example of FIG. 9. If a comparison is made to FIG. 10, it will be understood that the attribute value of the "DEGREE OF PORTRAIT-LIKE QUALITY" attribute of the "3.jpg" image has increased from 55% to 85%. On the other hand, whereas the attribute value of the "TYPE" attribute was "UNKNOWN", here this has been changed to the "PORTRAIT IMAGE" value. Owing to the changes, the image "3.jpg" will be a true matching image the next time a search is conducted.

Thus, according to this embodiment, from among attribute values of data that have been selected by a user, an attribute value which indicates, by a numerical value, the degree of certainty that data possesses a predetermined characteristic is increased or decreased based upon an attribute value, which has been designated by the user, indicating whether or not the data possesses the predetermined characteristic. Consequently, in accordance with the arrangement of this embodiment, it is possible to appropriately update, in accordance with operation by the user, an attribute value indicating the degree of certainty that data possesses a predetermined characteristic.

It should be noted that the above-described arrangement is applicable to any data, regardless of the type of data, such as documents containing text, images and moving pictures, etc. Further, the rule used when creating a list of provisionally matching images and the attribute-value assignment rule used when utilizing a provisionally matching image are not limited to the content exemplified above. For example, a mechanism through which the rules can be changed by the user may be provided.

In the example set forth above, it is assumed that when the reliability that an image is a portrait image rises, the reliability that it is as scenic image falls. That is, it is assumed that the characteristic of an image as a portrait image and the characteristic of an image as a scenic image are in a mutually contrary relationship. However, this does not necessarily impose a limitation. For example, it is permissible to adopt an arrangement that allows images to possess the reliability of each attribute value separately, e.g., the reliability of an image as both a portrait image and a scenic image. Further, reliability of an attribute on a user-by-user basis may be realized by managing, user by user, the changing value of reliability due to image utilization. This makes it possible to reflect user subjectivity in an attribute value.

Other Embodiments

It is permissible to adopt an arrangement in which the first and second embodiments are combined to implement both assignment of an attribute value for an attribute value that has not been set in accordance with utilization by the user, and addition of some degree of reliability and addition of reliability in accordance with utilization.

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiments). For this purpose, the program is provided to the computer for example via a network or from a recording medium of various types serving as the memory device (e.g., computer-readable medium).

In accordance with the present invention, it is possible to provide a technique in which search accuracy is improved by assigning an appropriate attribute value to data that is the target of a search without burdening the user with a complicated operation.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-274863, filed on Oct. 24, 2008, which is hereby incorporated by reference herein in its entirety.

What is claimed is:

1. An information processing apparatus comprising:
    a receiving unit constructed to receive user designation of at least one attribute value for one or more attribute items, wherein the user designated at least one attribute value and the corresponding one or more attribute items indicate a search condition of data;
    a presenting unit constructed to present data having the one or more attribute items of the search condition of which at least one attribute item has an unset attribute value, the presented data being from among a plurality of data that have been stored in a storage unit for storing the plurality of data and each attribute value of the plurality of data; and
    a setting unit constructed to set attribute values for data that has been selected by a user from among the data presented by said presenting unit, the setting being performed for each attribute item of the selected data that corresponds to the one or more attribute items of the search condition and that has an unset attribute value, wherein the setting unit sets the user designated at least one attribute value of the search condition to the attribute value for the attribute item of the selected data which has an unset attribute value,
    wherein a search is performed based on the search condition, and the setting is performed for data determined by the search.

2. The apparatus according to claim 1, wherein in a case where data has an attribute value that matches the at least one attribute value for which a designation has been received and remaining attribute values have not been set, said presenting unit presents data having the attribute value for which matching was achieved.

3. The apparatus according to claim 1, wherein said setting unit increases or decreases, based upon the designated at least one attribute value, an attribute value which indicates, by a numerical value, a probability that data possesses a predetermined characteristic, this attribute value being among attribute values of data that have been selected by the user.

4. The apparatus according to claim 1, wherein said presenting unit presents data matching all attribute values for which the designation has been received differently from data which does not do so, from among the plurality of data that have been stored in the storage unit.

5. The apparatus according to claim 1, wherein said setting unit updates an attribute value, which has been stored in the storage unit, in accordance with update confirmation from the user.

6. An information processing method of an information processing apparatus, comprising:
   a receiving step of receiving user designation of at least one attribute value for one or more attribute items, wherein the user designated at least one attribute value and the corresponding one or more attribute items indicate a search condition of data;
   a presenting step of presenting data having the one or more attribute items of the search condition of which at least one attribute item has an unset attribute value, the presented data being from among a plurality of data that have been stored in a storage unit for storing the plurality of data and each attribute value of the plurality of data; and
   a setting step of setting attribute values for data that has been selected by a user from among the data presented at said presenting step, the setting being performed for each attribute item of the selected data that corresponds to the one or more attribute items of the search condition and that has an unset attribute value, wherein the user designated at least one attribute value of the search condition is set to the attribute value for the attribute item of the selected data which has an unset attribute value,
   wherein a search is performed based on the search condition, and the setting is performed for data determined by the search.

7. A computer-readable storage medium retrievably storing a program for causing a computer to execute the following steps:
   a receiving step of receiving user designation of at least one attribute value for one or more attribute items, wherein the user designated at least one attribute value and the corresponding one or more attribute items indicate a search condition of data;
   a presenting step of presenting data having the one or more attribute items of the search condition of which at least one attribute item has an unset attribute value, the presented data being from among a plurality of data that have been stored in a storage unit for storing the plurality of data and each attribute value of the plurality of data; and
   a setting step of setting attribute values for data that has been selected by a user from among the data presented at said presenting step, the setting being performed for each attribute item of the selected data that corresponds to the one or more attribute items of the search condition and that has an unset attribute value, wherein the user designated at least one attribute value of the search condition is set to the attribute value for the attribute item of the selected data which has an unset attribute value,
   wherein a search is performed based on the search condition, and the setting is performed for data determined by the search.

8. The apparatus according to claim 1, wherein the search condition includes each one of the designated at least one attribute value and a corresponding one of the one or more attribute items.

9. The apparatus according to claim 8, wherein a search is performed to determine at least one data that has each attribute item included in the search condition, at least one such attribute item of the data having an attribute value that matches the corresponding attribute value of the search condition, each remaining such attribute item of the data having an unset attribute value.

10. The apparatus according to claim 9, wherein the data that has been selected by the user is data determined by the search, and
    wherein for each search condition attribute item of the selected data that has an unset attribute value, the setting unit sets the attribute item to the corresponding attribute value of the search condition.

11. The method according to claim 6, wherein the search condition includes each one of the designated at least one attribute value and a corresponding one of the one or more attribute items.

12. The method according to claim 11, wherein a search is performed to determine at least one data that has each attribute item included in the search condition, at least one such attribute item of the data having an attribute value that matches the corresponding attribute value of the search condition, each remaining such attribute item of the data having an unset attribute value.

13. The method according to claim 11, wherein the data that has been selected by the user is data determined by the search, and
    wherein for each search condition attribute item of the selected data that has an unset attribute value, the attribute item is set to the corresponding attribute value of the search condition in the setting step.

14. The computer-readable storage medium according to claim 7, wherein the search condition includes each one of the designated at least one attribute value and a corresponding one of the one or more attribute items.

15. The computer-readable storage medium according to claim 14, wherein a search is performed to determine at least one data that has each attribute item included in the search condition, at least one such attribute item of the data having an attribute value that matches the corresponding attribute value of the search condition, each remaining such attribute item of the data having an unset attribute value.

16. The computer-readable storage medium according to claim 15, wherein the data that has been selected by the user is data determined by the search, and
    wherein for each search condition attribute item of the selected data that has an unset attribute value, the attribute item is set to the corresponding attribute value of the search condition in the setting step.

17. The apparatus according to claim 1, wherein the data presented by the presenting unit and the data selected by the user is data determined by the search.

18. The method according to claim 6, wherein the data presented by the presenting unit and the data selected by the user is data determined by the search.

19. The computer-readable storage medium according to claim 7, wherein the data presented by the presenting unit and the data selected by the user is data determined by the search.

* * * * *